3,652,557
3-[γ-TERTIARY AMINO-β-ALKOXY BENZOYLOXY-PROPYL] - 4 - HYDROCARBON - 5,8 - ALKOXY COUMARINS
Rudi Beyerle, Bruchkobel, and Adolf Stachel, Rolf-Eberhard Nitz, Klaus Resag, and Eckard Schraven, Frankfurt am Main-Fechenheim, Germany, assignors to Cassella Farbwerke Mainkur Aktiengesellschaft, Frankfurt am Main-Fechenheim, Germany
No Drawing. Filed Jan. 8, 1969, Ser. No. 789,919
Claims priority, application Germany, Jan. 19, 1968,
P 16 68 877.0
Int. Cl. C07d 87/42
U.S. Cl. 260—247.2 B  3 Claims

ABSTRACT OF THE DISCLOSURE

The present invention relates to new coumarin compounds useful as coronary dilators and having the formula

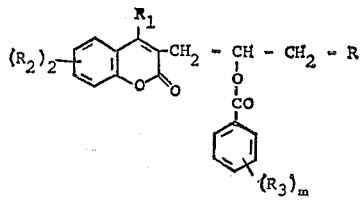

or the hydrochloric acid addition salts thereof, and to methods of preparing same either by acylating, in the presence of acid-binding agents, if desired, coumarin derivatives having the formula

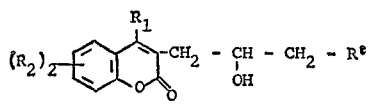

with acylating agents selected from the group consisting of alkoxybenzoic acid having the formula

and functional derivative thereof, or by condensing, in the presence of acid-binding agents, if desired, coumarin derivatives having the formula

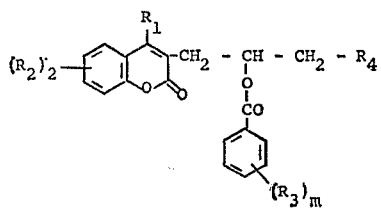

with an amine having the formula RH, wherein R is a radical selected from the group consisting of morpholino, piperidino and pyrrolidine, which is bound via a nitrogen atom; $R_1$ is selected from the group consisting of alkyl radicals having 1-4 carbon atoms and phenyl radicals; $R_2$ is selected from the group consisting of 5,7-, 6,7- and 7,8-positioned alkoxy groups having 1-4 carbon atoms; $R_3$ is selected from alkoxy groups having 1-4 carbon atoms; $R_4$ is selected from the group consisting of chlorine and bromine; R' is selected from the group consisting of morpholino, piperidino and pyrrolidino, which is bound via a nitrogen atom; and $m$ is selected from the group consisting of 1, 2, and 3.

---

The present invention relates to new pharmacologically valuable, basically substituted coumarin compounds having the general formula

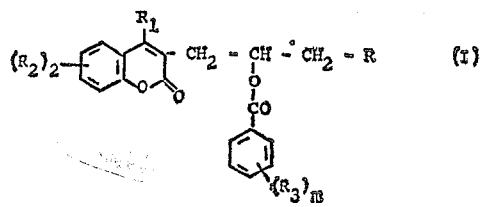

wherein:

R is selected from the group consisting of morpholino, piperidino and pyrrolidino, which is bound via a nitrogen atom,
$R_1$ is selected from the group consisting of alkyl radicals having 1-4 carbon atoms and phenyl radicals;
$R_2$ is selected from the group consisting of 5,7-, 6,7-, and 7,8-positioned alkoxy groups having 1-4 carbon atoms;
$R_3$ is selected from alkoxy groups having 1-4 carbon atoms; and
$m$ is selected from the group consisting of 1, 2, and 3.

The radical of an amine R which is bound via a nitrogen atom may derive in the aliphatic series from mono and diamines, such as alkylamines, dialkylamines, alkenylamines, alkylendiamines, hydroxyalkylamines, alkoxyalkylamines and acyloxyalkylamines.

Amines of this type are for instance: methylamine, ethylamine, propylamine, butylamine, dimethylamine, diethylamine, allylmethylamine, N,N - diethyl-N'-methyl-ethylene-diamine, N,N - diethyl - N' - methyl - propylene-diamine, N - methyl - ethanolamine, N - methyl - propanolamine, N-isopropylethanolamine, N - butyl - ethanolamine, N-benzyl-ethanolamine. The hydroxy groups of the above-mentioned hydroxyalkylamines may be esterified with a carboxylic acid. As carboxylic acids are used for instance: formic acid, acetic acid, carbonic acid mono-ester and alkoxybenzoic acids.

The amines of the araliphatic series which are used are for instance: phenalkyl-alkylamines, such as benzylmethylamines, 3,4 - dimethoxyphenethyl - methylamine, 2,3,4 - trimethoxyphenethyl - methylamine, 3,4 - dimethoxyphenylisopropyl - methylamine, 2,3,4 - trimethoxyphenylisopropyl-methylamine.

The aromatic amines that are used are for instance: N-methylaniline, N-methyl-p-anisidine, M-methyl-3,4-dimethoxy-aniline, N - methyl-3,4,5-trimethoxyaniline, N-methyl-p-chloro-aniline.

As suitable heterocyclic nitrogen bases free of acyloxy groups may be mentioned for instance: 5 or 6-membered heterocyclic nitrogen bases, such as pyrrolidine, morpholine, piperidine, N-methylpiperazine, N-(β-hydroxyethyl)- piperazine, N-(γ-hydroxypropyl)-piperazine, N-(p-chlorophenyl)-piperazine, N-(2,3,4-trimethoxybenzyl)-piperazine, N - (3,4-dimethoxybenzyl)-piperazine, N-(2,6-dimethylphenyl-carbamoylmethyl)-piperazine, N-(3,4,5-trimethoxyphenylcarbamoylmethyl)-piperazine.

The coumarin derivatives according to the present invention are obtained in the different known per se methods, the method chosen depending on the envisaged constitution of the final product.

The simplest method of obtaining the coumarin derivatives according to the present invention is to acylate, optionally in the presence of an acid-binding agent, coumarin derivatives of the general formula

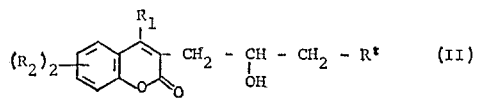

wherein R' means a radical of an aliphatic, cycloaliphatic, araliphatic, aromatic amine or of a 5- or 6-membered heterocyclic nitrogen base free of hydroxy groups, which is bound via a nitrogen atom, with an alkoxybenzoic acid having the general formula

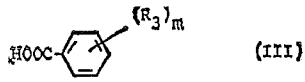

or with a functional derivative thereof and to eliminate by hydrogenation or saponification protective groups in the radical R', if any, which are capable of splitting off and are linked to oxygen or nitrogen atoms.

The 3-γ-amino-β-hydroxy-propyl-coumarins required as starting materials for this process are obtained by reacting according to the known methods, for instance analogously to the teachings of British Pats. 1,067,626 and 1,135,907, the corresponding amines with the 3-γ-halogen-β-hydroxy-propyl-coumarins, or with the corresponding 3-(2',3'-epoxypropyl)-coumarins. Even if primary amines are used as starting materials for this process, it is surprising that the substitution of the halogen atom of 3-γ-halogen-β-hydroxy-propyl-coumarins by the amine radical gives satisfactory yields without involving any adverse side reactions. By subsequent alkylation the hydrogen atom of a secondary amino group, if any, may be substituted by an alkyl or aralkyl radical.

By using starting materials, wherein the radical of an amine R', bound via the nitrogen atom, contains a hydroxyalkyl group, the corresponding diesters are obtained if 2 moles of the alkoxybenzoic acid or of a functional derivative thereof are employed.

Those coumarin derivatives according to the present invention wherein the radical R is bound via the nitrogen atom of a secondary amino group may also be prepared by starting from such coumarin derivatives of the general Formula II in which the final secondary amino group contains a protective group capable of splitting off. Thus, after the acylation of the secondary hydroxyl group with an alkoxybenzoic acid or the functional derivative thereof and after the subsequent splitting off of the N-positioned protective group, the secondary alkoxybenzoic acid esters of coumarin of the present invention having the above-mentioned general Formula I are obtained, which contain a secondary amino group in the molecule. Particularly suited as protective groups in the above-mentioned sense, which are capable of splitting off are, for instance, the benzyl and benzyloxycarbonyl radicals.

It is advisable to prepare such coumarin derivatives containing a free primary hydroxyl group in the amine radical R by stepwise esterification. In this instance the primary hydroxyl group is at first protected by means of an acyl radical as protective group capable of splitting off, then the secondary hydroxyl group that is still free is reacted with an alkoxybenzoic acid or a functional derivative thereof, and finally the above-mentioned acyl radical is split off again from the primary hydroxyl group.

Another method of preparing the compounds of the present invention which have the general Formula I consists in that coumarin derivatives of the general formula

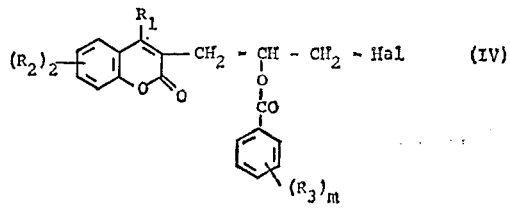

wherein hal stands for a halogen atom are reacted, optionally in the presence of an acid-binding agent, with an amine of the general formula RH.

Particularly used as amines or bases having the general formula RH are all compounds mentioned above in connection with the definition of the radical R.

The starting materials of the general formula IV are obtained by acylating the corresponding 3-γ-halogen-β-hydroxy-propyl-coumarins with an alkoxybenzoic acid of the general formula

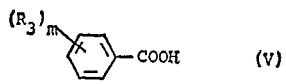

or with a functional derivative thereof. The reaction may be performed in the presence or absence of an inert solvent and possibly in the presence of an acid-binding agent.

As low-molecular alkyl radicals $R_1$ and alkoxy radicals $R_2$ or $R_3$ are used particularly those having 1–4 carbon atoms.

The coumarin derivatives obtainable under the present invention are valuable pharmaceutics. In particular, they are excellent coronary dilators and, in this respect, superior to other known substances having such properties. Their salts are colorless, crystalline substances that easily dissolve in water.

With respect to the change in the oxygen tension in the coronary veinous blood, the pharmacological investigation of the vasodilator action on the cornary vessels was carried out in dogs according to the methods described by W. K. A. Schaper and his co-workers (see W. K. A. Schaper, R. Xhonneux, and J. M. Bogaard "Uber die kontinuierliche Messung des Sauerstoffdruckes im venösen Coronarbult" (Naunyn-Schmiedeberg's Arch, exp. Path. u. Pharmak. 245, 383–389 (1963)). The test preparations were applied intravenously to the narcotized and spontaneously breathing animals. On these test conditions the dilatation of the coronary arteries caused by the test substances along with the increase in the coronary blood flow led to an increase in the oxygen tension in the coronary veinous blood. This oxygen tension was measured according to polarographic methods by means of a platin electrode of the Gleichmann-Lübbers type (see U. Gleichmann and D. W. Luebbers "Die Messung des Sauerstoffdruckes in Gasen und Flüssigkeiten mit der Platin-Elektrode unter besonderer Berücksichtigung der Messung im Blut," Pflügers Arch. 271, 431–455 (1960)).

The heart rate was continuously measured by electronic methods from systolic peaks of the arterial blood pressure. The arterial blood pressure was measured in the known manner in the femoral artery with the aid of an electromanometer of the Stathamstrain-gauge type.

The following table gives the results of the pharmacological investigations which were carried through. The preparations were tested in the form of their respective dihydrochlorides:

| Preparation | LD₅₀, g./kg., mouse | Dosage, mg./kg. i.v. | Maximal increase in oxygen tension in the coronary venous blood | | Maximal change in the heart rate | | Maximal change in the blood pressure (systolic/diastolic) | |
|---|---|---|---|---|---|---|---|---|
| | | | Percent | Minutes | Percent | Minutes | Percent | Minutes |
| 3-[γ-morpholino-β-(3,4,5-trimethoxybenzoxy)-propyl]-4-methyl-7,8-dimethoxy-coumarin | ¹0.14 | 0.5 | +127 | >50 | −21 | 50 | −27/−41 | 50 |
| 3-[γ-(N-methyl-N-β-cyanoethyl-amino)-β-(3,4,5-trimethoxy-benzoxy)-propyl]-4-methyl-7,8-dimethoxy-coumarin | | 0.5 | +182 | >60 | −9 | >60 | −8/−14 | >60 |
| 3-[γ-{N,N-bis-(β-ethoxycarbonylethyl)-amino}-β-(3,4,5-trimethoxybenzoxy)-propyl]-4-methyl-7,8-dimethoxy-coumarin | | 0.4 | +74 | 30 | −10 | >30 | +5/+7 | >30 |
| 3-[γ-thiomorpholino-β-(3,4,5-trimethoxybenzoxy)-propyl]-4-methyl-7,8-dimethoxy-coumarin | | 0.5 | +78 | >35 | −5 | >35 | −17/−28 | 20 |
| 3-[γ-(N-methyl-N-furfuryl-amino)-β-(3,4,5-trimethoxy-benzoxy)-propyl]-4-methyl-7,8-dimethoxy-coumarin | ¹0.145 | 0.5 | +135 | >10 | −8 | >15 | −40/−38 | >10 |
| 3-[γ-piperidino-β-(3,4,5-trimethoxybenzoxy)-propyl]-4-methyl-7,8-dimethoxy-coumarin | ¹0.042 | 0.5 | +89 | 30 | −9 | >30 | −9/−25 | 2 |
| 3-[γ-(N-methyl-N-bicyclo[2.2.1]-hept-2-ylmethyl-amino)-β-(3,4,5-trimethoxybenzoxy)-propyl]-4-methyl-7,8-dimethoxy-coumarin | ¹0.11 | 0.5 | +113 | 25 | −7 | >25 | −14/−17 | 20 |
| 3-[γ-(N-methyl-N-bicyclo[2.2.1]-hept-2-en-6-ylmethyl-amino)-β-(3,4,5-trimethoxybenzoxy)-propyl]-4-methyl-7,8-dimethoxy-coumarin | ¹0.13 | 0.5 | +61 | >35 | −8 | >35 | ±0/−5 | 5 |
| 3-[γ-{N-methyl-N-(1-ethyl-piperidin-3-yl)-amino}-β-(3,4,5-trimethoxybenzoxy)-propyl]-4-methyl-7,8-dimethoxy-coumarin | ¹0.024 | 0.5 | +32 | >25 | +27 | >25 | −15/−8 | >25 |
| 3-[γ-(N-methyl-N-cyclopropyl-amino)-β-(3,4,5-trimeth-oxybenzoxy)-propyl]-4-methyl-7,8-dimethoxy-coumarin | ¹0.06 | 0.5 | +36 | 40 | +12 | >20 | −6/−16 | 20 |
| 3-[γ-(N-methyl-N-tetrahydro-fufuryl-amino)-β-(3,4,5-trimethoxybenzoxy)-propyl]-4-methyl-7,8-dimethoxy-coumarin | ²0.35 | 0.5 | +108 | >45 | −7 | 45 | −30/−35 | >45 |
| 3-[γ-(N-methyl-N-cyclohexylamino)-β-(3,4,5-trimethoxy-benzoxy)-propyl]-4-methyl-7,8-dimethoxy-coumarin | | 0.5 | +73 | >110 | −28 | >110 | −18/−50 | >110 |
| 3-[γ-morpholino-β-(3,4,5-trimethoxybenzoxy)-propyl]-4-methyl-7,8-di-n-butoxy-coumarin | ²>1 | 0.5 | +50 | >30 | −6 | 20 | −8/−19 | 30 |
| 3-[γ-morpholino-β-(2-n-butoxy-3,4-dimethoxybenzoxy)-propyl]-4-methyl-7,8-dimethoxy-coumarin | | 0.5 | +53 | >30 | +7 | >30 | +14/+7 | >30 |
| 3-[γ-morpholino-β-(3,4,5-triethoxybenzoxy)-propyl]-4-methyl-7,8-dimethoxy-coumarin | | 0.5 | +68 | >100 | −24 | >100 | −10/−10 | >100 |
| 3-[γ-morpholino-β-(4-n-butoxy-3,5-dimethoxy-benzoxy)-propyl]-4-methyl-7,8-dimethoxy-coumarin | | 0.5 | +97 | >80 | +10 | 80 | +2/−13 | 60 |
| 3-[γ-diethylamino-β-(3,4,5-trimethoxybenzoxy)-propyl]-4-methyl-7,8-dimethoxy-coumarin | ¹0.026 | 0.5 | +70 | 40 | +7 | 40 | −17/−29 | 20 |
| 3-[γ-pyrrolidino-β-(3,4,5-trimethoxybenzoxy)-propyl]-4-methyl-7,8-dimethoxy-coumarin | | 0.5 | +59 | 20 | +12 | 10 | −21/−25 | >20 |
| 3-[γ-(N-3,4-dimethoxy-benzyl-piperazino)-β-(3,4,5-tri-methoxybenzoxy)-propyl]-4-methyl-7,8-dimethoxy-coumarin | | 0.5 | +60 | >25 | −20 | >25 | −57/−66 | >25 |
| 3-[γ-{N-(2,6-dimethylainilidocarbonylmethyl)-pipe-razino}-β-(3,4,5-trimethoxybenzoxy)-propyl]-4-methyl-7,8-dimethoxy-coumarin | ¹>0.4 | 0.5 | +36 | >20 | ±0 | | ±0 | |
| 3-[γ-morpholino-β-(3,4,5-trimethoxybenzoxy)-propyl]-4-n-propyl-7,8-dimethoxy-coumarin | ¹0.22 | 9.5 | +120 | >50 | −14 | 20 | −4/−11 | >50 |
| 3-[γ-diethylamino-β-(3,4,5-trimethoxybenzoxy)-propyl]-4-n-propyl-7,8-dimethoxy-coumarin | ¹0.05 | 0.5 | +35 | >65 | +6 | >65 | −25/−23 | >65 |
| 3-[γ-diethylamino-β-(3,4,5-trimethoxybenzoxy)-propyl]-4-phenyl-7,8-dimethoxy-coumarin | | 0.5 | +55 | 30 | +16 | >40 | ±0 | |
| 3-[γ-morpholino-β-(3,4,5-trimethoxybenzoxy)-propyl]-4-methyl-6,7-dimethoxy-coumarin | ¹0.18 | 0.1 | +112 | 10 | +32 | 5 | −7 | >20 |
| 3-[γ-morpholino-β-(3,4,5-trimethoxybenzoxy)-propyl]-4-phenyl-6,7-dimethoxy-coumarin | ¹>0.4 | 1.0 | +80 | 10 | −8 | >20 | −11/−10 | >20 |
| 3-[γ-diethylamino-β-(3,4,5-trimethoxybenzoxy)-propyl]-4-phenyl-6,7-dimethoxy-coumarin | ²0.6 | 1.0 | +75 | 10 | −11 | 10 | −5/−15 | >20 |
| 3-[γ-morpholino-β-(3,4,5-trimethoxybenzoxy)-propyl]-4-methyl-5,7-dimethoxy-coumarin | | 0.1 | +48 | 10 | +27 | >20 | −13 | >20 |
| 3-[γ-morpholino-β-(3,5-dimethoxybenzoxy)-propyl]-4-methyl-7,8-dimethoxy-coumarin | ¹0.16 | 0.5 | +118 | >30 | −5 | >30 | +6/+5 | 10 |
| 3-[γ-(N-methyl-N-3,4-di-methoxyphenylisopropylamino)-β-(3,4,5-trimethoxy-benzoxy)-propyl]-4-methyl-7,8-dimethoxy-coumarin | | 0.5 | +30 | >55 | −10 | 30 | −5/−22 | 30 |
| 3-[γ-(N-methyl-N-allyl-amino)-β-(3,4,5-trimethoxy-benzoxy)-propyl]-4-methyl-7,8-dimethoxy-coumarin | ¹0.015 | 0.5 | +64 | >55 | −15 | >55 | +23/+13 | >55 |
| 3-[γ-(N-methyl-N-ethoxypropyl-amino)-β-(3,4,5-trimethoxybenzoxy)-propyl]-4-methyl-7,8-dimethoxy-coumarin | | 0.5 | +105 | >40 | −12 | 25 | +11/+11 | 2 |
| 3-[γ-(N-methyl-N-diethylaminopropyl-amino)-β-(3,4,5-trimethoxybenzoxy)-propyl]-4-methyl-7,8-dimethoxy-coumarin | ¹0.0525 | 0.5 | +65 | >80 | −18 | >80 | −17/−17 | 35 |
| 3-[γ-(N-methyl-N-3,4-dimethoxyphenethyl-amino)-β-(3,4,5-trimethoxybenzoxy)-propyl]-4-methyl-7,8-dimethoxy-coumarin | | 0.5 | +27 | 30 | −9 | 30 | +4/−17 | 10 |
| 3-[γ-(N-methyl-N-2,3,4-trimethoxyphenethyl-amino)-β-(3,4,5-trimethoxybenzoxy)-propyl]-4-methyl-7,8-dimethoxy-coumarin | | 0.5 | +36 | 90 | −15 | >90 | −14/−16 | >90 |
| 3-[γ-(N-methyl-N-2,3,4-trimethoxyphenylisopropyl-amino)-β-(3,4,5-trimethoxybenzoxy)-propyl]-4-methyl-7,8-dimethoxy-coumarin | | 0.5 | +52 | >40 | −10 | >40 | −11/−15 | >40 |
| 3-[γ-N-methylamino-β-(3,4,5-trimethoxybenzoxy)-propyl]-4-methyl-7,8-dimethoxy-coumarin | ¹0.067 | 0.5 | +74 | >30 | −3 | 2 | −10/−23 | >30 |
| 3-[γ-{N-n-butylamino-β-(3,4,5-trimethoxybenzoxy)-propyl]-4-methyl-7,8-dimethoxy-coumarin | | 1.0 | +113 | 20 | −39 | 5 | −12/−37 | >20 |
| 3-[γ-{N-methyl-N-β-(3,4,5-trimethoxybenzoxy)-ethyl-amino}-β-(3,4,5-trimethoxybenzoxy)-propyl]-4-methyl-7,8-dimethoxy-coumarin | ¹0.095 | 0.5 | +200 | >60 | −9 | 60 | +15 | >60 |
| 3-[γ-{N-methyl-N-β-(3,4,5-trimethoxybenzoxy)-ethyl-amino}-β-(3,4,5-trimethoxybenzoxy)-propyl]-4-n-propyl-7,8-dimethoxy-coumarin | | 0.5 | +41 | 20 | +92 | 20 | −6/−11 | 10 |
| 3-[γ-{N-methyl-N-β-(3,4,5-trimethoxybenzoxy)-ethyl-amino}-β-(3,4,5-trimethoxybenzoxy)-propyl]-4-methyl-6,7-dimethoxy-coumarin | ²>1.0 | 0.5 | +30 | 20 | −5 | 20 | −4/−5 | >20 |
| 3-[γ-{N-methyl-N-β-(3,4,5-trimethoxybenzoxy)-ethyl amino}-β-(3,4,5-trimethoxybenzoxy)-propyl]-4-methyl-5,7-dimethoxy-coumarin | ²>1.0 | 0.5 | +40 | 20 | −2 | 5 | +1,5/−1 | 3 |

See footnotes at end of table.

TABLE—Continued

| Preparation | $LD_{50}$, g./kg., mouse | Dosage, mg./kg. i.v. | Maximal increase in oxygen tension in the coronary veinous blood | | Maximal change in the heart rate | | Maximal change in the blood pressure (systolic/diastolic) | |
|---|---|---|---|---|---|---|---|---|
| | | | Percent | Minutes | Percent | Minutes | Percent | Minutes |
| 3-[γ-(N-n-butyl-N-β-hydroxyethylamino)-β-(3,4,5-trimethoxybenzoxy)-propyl]-4-methyl-7,8-dimethoxy-coumarin | [2] 0.23 | 0.5 | +238 | >70 | −13 | 30 | −14/−26 | >70 |
| 3-[γ-(N-methyl-N-β-hydroxyethyl-amino)-β-(3,4,5-trimethoxybenzoxy)-propyl]-4-methyl-7,8-dimethoxy-coumarin | [1] 0.18 | 0.5 | +92 | >60 | −16 | >60 | −12.5/−22 | >60 |
| 3-[γ-(N-methyl-N-β-hydroxyethyl-amino)-β-(3,4,5-trimethoxybenzoxy)-propyl]-4-methyl-6,7-dimethoxy-coumarin | [1] 0.16 | 0.5 | +97 | >40 | +3 | >40 | −34/−34 | >40 |

[1] Intravenously.
[2] Intraperitoneally.

In the preparation of dragées and tablets containing as essential active ingredient the coumarin derivatives of our invention these substances may be admixed with the conventional solid tabletting adjuvants, such as starch, lactose, talc and the like. Any of the tabletting materials and carriers customary in pharmaceutical practice may be employed.

For the preparation of the injection solutions the hydrochlorides of the coumarin derivatives are particularly suited since they have mostly a good water-solubility. Injection solutions of water-insoluble products may of course be prepared in the conventional manner by concurrently using well known suspending agents, emulsifiers and/or solubilizers.

For a better understanding of the nature and the objects of this invention, reference should be made to the accompanying examples which are of an illustrative rather than a limiting nature. Unless otherwise stated, all temperatures given are in degrees centigrade.

EXAMPLE 1

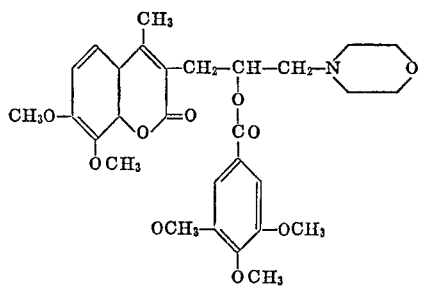

36.3 g. (0.1 mol) 3-(γ-morpholino-β-hydroxy-propyl)-4-methyl-7,8-dimethoxy-coumarin are dissolved in 200 cc. anhydrous benzene and 10.1 g. (0.1 mol) triethylamine are added. Within 30 minutes, a solution of 23 g. (0.1 mol) 3,4,5-trimethoxybenzoylchloride in 100 cc. anhydrous benzene is added dropwise with stirring at room temperature. The reaction mixture is stirred at this temperature for 2 hours, subsequently for another 5 hours under reflux and, while hot, filtered off, with suction from the separated triethylamine hydrochloride. The filtrate is washed with water, then with a 10% aqueous sodium bicarbonate solution and again with water, and finally dried over anhydrous sodium sulfate. Subsequently, the solvent is distilled off at 50° in the water-jet vacuum. The residue, a colorless, crystalline powder is pasted with a small amount of methanol and subsequently filtered off with suction. By recrystallizing from methanol 3-[γ-morpholino - β-(3,4,5-trimethoxybenzoxy)-propyl]-4-methyl-7,8-dimethoxy-coumarin in the form of colorless crystals is obtained having a melting point of 163–165°.

Yield: 42 g. = 75.5% of the theoretical.

The 3 -(γ-morpholino-β-hydroxy-propyl)-4-methyl-7,8-dimethoxy-coumarin used as starting material, can be prepared as follows: 31.2 g. (0.1 mol) 3-(γ-chloro-β-hydroxy-propyl) - 4 - methyl-7,8-dimethoxy-coumarin (prepared according to the method described in British Pat. 1,135,907, Example 2, paragraph 2) and 9.5 g. (0.108 mol) morpholine are dissolved in 150 cc. anhydrous chloro-benzene and, after the addition of 11.0 g. anhydrous sodium carbonate, stirred for 12 hours at 120°. After cooling down, the mixture is filtered off with suction from the precipitated sodium chloride, subsequently the filtrate is evaporated to dryness under reduced pressure. For further purification, the crude product thus obtained is dissolved in ethyl acetate, then washed with water and dried over potassium carbonate. When hydrochloric acid gas in introduced into the ethyl acetate solution the hydrochloride of 3-(γ-morpholino-β-hydroxy-propyl)-4-methyl-7,8-dimethoxy-coumarin precipitates in the form of colorless crystals melting at 200°.

Yield: 31 g. = 78% of the theoretical.

Analogously to this example the following basically substituted coumarin derivatives according to the present invention can be prepared:

General formula:

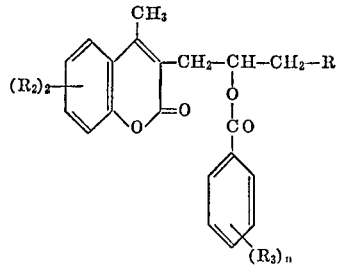

| $(R_2)_2$ | R | $(R_3)_m$ | Melting point of the hydrochloride (degrees) |
|---|---|---|---|
| 7,8-$(OCH_3)_2$ | —N($CH_3$)—$CH_2CH_2CN$ | 3,4,5-$(OCH_3)_3$ | [1] 70 |
| 7,8-$(OCH_3)_2$ | —N($CH_2CH_2COOC_2H_5$)$_2$ | 3,4,5-$(OCH_3)_3$ | 108 |
| 7,8-$(OCH_3)_2$ | —N⟩S | 3,4,5-$(OCH_3)_3$ | 208–211 |

See footnotes at end of table.

TABLE I—Continued

| $(R_2)_2$ | R | $(R_3)_m$ | Melting point of the hydrochloride (degrees) |
|---|---|---|---|
| 7,8-$(OCH_3)_2$ | $-N(CH_3)-CH_2-$furyl | 3,4,5-$(OCH_3)_3$ | [1] 85 |
| 7,8-$(OCH_3)_2$ | $-N$-piperidinyl (H) | 3,4,5-$(OCH_3)_3$ | 126 |
| 7,8-$(OCH_3)_2$ | $-N(CH_3)-CH_2-$cyclohexyl($CH_3$) | 3,4,5-$(OCH_3)_3$ | 153 |
| 7,8-$(OCH_3)_2$ | $-N(CH_3)-CH_2-$cyclohexyl(=$CH_2$) | 3,4,5-$(OCH_3)_3$ | 143 |
| 7,8-$(OCH_3)_2$ | $-N(CH_3)-$piperidinyl($N-C_2H_5$) | 3,4,5-$(OCH_3)_3$ | 168 |
| 7,8-$(OCH_3)_2$ | $-N(CH_3)-CH$(cyclopropyl $CH_2/CH_2$) | 3,4,5-$(OCH_3)_3$ | 118 |
| 7,8-$(OCH_3)_2$ | $-N(CH_3)CH_2-$tetrahydrofuryl | 3,4,5-$(OCH_3)_3$ | 115 |
| 7,8-$(OCH_3)_2$ | $-N(CH_3)-$cyclohexyl(H) | 3,4,5-$(OCH_3)_3$ | 118 |
| 7,8-$(O\text{-}n.C_4H_9)_2$ | $-N$-morpholinyl | 3,4,5-$(OCH_3)_3$ | 123 |
| 7,8-$(OCH_3)_2$ | Same as above | 2-$(O\text{-}n.C_4H_9)$, 3,4-$(OCH_3)_2$ | 213 |
| 7,8-$(OCH_3)_2$ | ....do.... | 3,4,5-$(OC_2H_5)_3$ | 133 |
| 7,8-$(OCH_3)_2$ | ....do.... | 4-$(O\text{-}n.C_4H_9)$,3,5-$(OCH_3)_2$ | 147 |

[1] Decomposition.

EXAMPLE 2

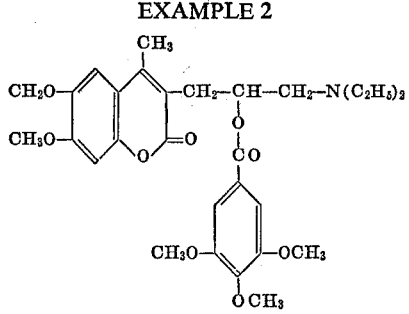

18.5 g. (0.053 mol) 3-(γ-diethylamino-β-hydroxy-propyl)-4-methyl-6,7-dimethoxy-coumarin are dissolved in 100 cc. anhydrous toluene. After the addition of 5.4 g. (0.0535 mol) triethylamine, a solution of 12.2 g. (0.053 mol) 3,4,5-trimethoxybenzoylchloride in 50 cc. anhydrous toluene is added dropwise with stirring at room temperature. Stirring is continued for 2 hours at room temperature and for another 5 hours at 100°. After cooling down, the reaction mixture is worked up as described in Example 1. Thus, the 3-[γ-diethylamino-β-(3,4,5-trimethoxybenzoxy)-propyl]-4-methyl-6,7-dimethoxy-coumarin is obtained, having a melting point of 165–167°.

Yield: 27 g.=88% of the theoretical.

The 3-(γ-diethylamino-β-hydroxy-propyl)-4-methyl-6,7-dimethoxy-coumarin used as starting material can be prepared as follows:

(a) 28.4 g. (0.1 mol) 3-(γ-chloro-β-hydroxy-propyl)-4-methyl-6,7-dihydroxy-coumarin (prepared by condensing α-acetyl-γ-chloro-methyl-butyrolactone with 1,2,4-triacetoxybenzene, analogously to the technique described in British Pat. 1,044,608) are dissolved with heating in 300 cc. dioxan. After cooling down to 30°, 37.8 g. (0.3 mol) dimethyl sulfate are added. Then, with stirring, a solution of 12 g. (0.3 mol) sodium hydroxide in 30 cc. water, is added dropwise. The reaction mixture is then stirred for 3 hours at 25–30° and, after a further addition of 18.9 g. (0.15 mol) dimethyl sulfate, a solution of 6 g. (0.15 mol) sodium hydroxide in 20 cc. water is added dropwise with stirring. After having stirred for 5 hours at room temperature the reaction mixture is diluted with water and the separating crude product is dissolved in methylene chloride. For further purification purposes the methylene chloride layer is first washed with a diluted sodium hydroxide solution, then with water and subsequently dried. Thus, after evaporating the methylene chloride solution to dryness under reduced pressure 3-(2′,3′-epoxypropyl)-4-methyl-6,7-dimethoxy-coumarin is obtained having a melting point of 144–146°.

Yield: 18 g.=65.2% of the theoretical.

(b) 18 g. (0.065 mol) 3-(2',3'-epoxypropyl)-4-methyl-6,7-dimethoxy-coumarin are dissolved in 80 cc. ethanol and, after the addition of 14.6 g. (0.2 mol) diethylamine, stirred for 12 hours at 110° in an autoclave. After cooling down, the reaction mixture is evaporated to dryness under reduced pressure. For further purification, the residue is recrystallized from ethyl acetate. Thus, 3-(γ-diethylamino-β-hydroxy - propyl)-4-methyl-6,7-dimethoxy-coumarin is obtained in the form of colorless needles melting at 105–106°.

Yield: 18.5 g.=84% of the theoretical.

Analogously to the methods described in Example 1, paragraph 2, and Example 2, paragraph (b), the following starting materials can be obtained. The 3-(γ-chloro-β-hydroxy-propyl)-6,7- or -7,8-dimethoxy-coumarins required for their preparation are described in British Pat. 1,135,907, Example 2, paragraph 2, and Example 6, paragraph 3. Analogously, the preparation of the 3-(γ-chloro-β-hydroxy-propyl)-4-methyl - 5,7 - dimethoxy-coumarin having a melting point of 125–128° can be carried out by methylation with dimethyl sulfate of 3-(γ-chloro-β-hydroxy-propyl)-4-methyl-5,7-dihydroxy-coumarin having a melting point of 247–248°.

General formula of the respective starting materials:

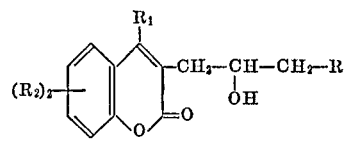

| $(R_2)_2$ | $R_1$ | R | Melting point (degrees) |
|---|---|---|---|
| 7,8-(OCH₃)₂ | CH₃ | —N(C₂H₅)₂ | 82 |
| 7,8-(OCH₃)₂ | CH₃ | —N⟨piperidine⟩ | 99–101 |
| 7,8-(OCH₃)₂ | CH₃ | —N⟨piperidine⟩ | 110 |
| 7,8-(OCH₃)₂ | CH₃ | —N(CH₃)—CH₂CH₂N(C₂H₅)₂ | 103 |
| 7,8-(OCH₃)₂ | CH₃ | —N⟨⟩N—CH₃ | ¹75 |
| 7,8-(OCH₃)₂ ........ | CH₃ | —N⟨⟩N—C₆H₄—Cl | 180 |
| 7,8-(OCH₃)₂ | CH₃ | —N⟨⟩N—CH₂—C₆H₂(OCH₃)(CH₃O)(OCH₃) | ¹233 |
| 7,8-(OCH₃)₂ | CH₃ | —N⟨⟩N—CH₂—C₆H₃(OCH₃)(OCH₃) | 261 |
| 7,8-(OCH₃)₂ | CH₃ | —N⟨⟩N—CH₂—CO—NH—C₆H₃(CH₃)(CH₃) | 159 |
| 7,8-(OCH₃)₂ | CH₃ | —N⟨⟩N—CH₂—CO—NH—C₆H₂(OCH₃)(OCH₃)(OCH₃) | 158 |
| 7,8-(OCH₃)₂ | C₃H₇ | —N⟨morpholine⟩ | ²190 |
| 7,8-(OCH₃)₂ | C₃H₇ | —N⟨piperidine⟩ | 188 |
| 7,8-(OCH₃)₂ | C₃H₇ | —N(C₂H₅)₂ | 112 |
| 7,8-(OCH₃)₂ | C₆H₅ | —N(C₂H₅)₂ | ²190 |
| 7,8-(OCH₃)₂ | C₆H₅ | —N⟨morpholine⟩ | 124–125 |
| 7,8-(OCH₃)₂ | C₆H₅ | —N⟨piperidine⟩ | ²156 |
| 6,7-(OCH₃)₂ | CH₃ | —N⟨morpholine⟩ | 250 |
| 6,7-(OCH₃)₂ | CH₃ | —N⟨piperidine⟩ | 136 |
| 6,7-(OCH₃)₂ | C₃H₇ | —N(C₂H₅)₂ | ²195 |

See footnotes at end of table.

TABLE—Continued

| (R₂)₂ | R₁ | R | Melting point (degrees) |
|---|---|---|---|
| 6,7-(OCH₃)₂ | C₃H₇ | —N○O (morpholino) | 125 |
| 6,7-(OCH₃)₂ | C₆H₅ | Same as above | ² 135 |
| 6,7-(OCH₃)₂ | C₆H₅ | —N(C₂H₅)₂ | ³ 116 |
| 5,7-(OCH₃)₂ | CH₃ | —N○O (morpholino) | ² 231 |

¹ Dihydrochloride.
² Hydrochloride.

Analogously to the description given in Examples 1 and 2, paragraphs 1, the following compounds under the present invention can be prepared:

General formula:

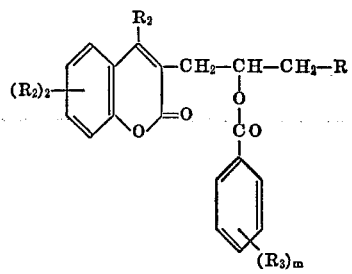

| (R₃)ₘ | (R₂)₂ | R₁ | R | Melting point (degrees) |
|---|---|---|---|---|
| 3,4,5-(OCH₃)₃ | 7,8-(OCH₃)₂ | CH₃ | —N(C₂H₅)₂ | ¹ 229–232 |
| 3,4,5-(OCH₃)₃ | 7,8-(OCH₃)₂ | CH₃ | —N (pyrrolidino) | ¹ 163–166 |
| 3,4,5-(OCH₃)₃ | 7,8-(OCH₃)₂ | CH₃ | —N (piperidino) | ¹ 130 |
| 3,4,5-(OCH₃)₃ | 7,8-(OCH₃)₂ | CH₃ | —N(CH₃)—CH₂CH₂N(C₂H₅)₂ | ² 152–153 |
| 3,4,5-(OCH₃)₃ | 7,8-(OCH₃)₂ | CH₃ | —N⟩N—CH₃ | ² 160 |
| 3,4,5-(OCH₃)₃ | 7,8-(OCH₃)₂ | CH₃ | —N⟩N—C₆H₄—Cl | ² 155 |
| 3,4,5-(OCH₃)₃ | 7,8-(OCH₃)₂ | CH₃ | —N⟩N—CH₂—C₆H₂(OCH₃)₃ (3,4,5-trimethoxybenzyl) | ² 280 |
| 3,4,5-(OCH₃)₃ | 7,8-(OCH₃)₂ | CH₃ | —N⟩N—CH₂—C₆H₃(OCH₃)₂ (3,4-dimethoxybenzyl) | ² 240 |
| 3,4,5-(OCH₃)₃ | 7,8-(OCH₃)₂ | CH₃ | —N⟩N—CH₂—CO—NH—C₆H₂(CH₃)₂(OCH₃) | ² 161 |
| 3,4,5-(OCH₃)₃ | 7,8-(OCH₃)₂ | CH₃ | —N⟩N—CH₂—CO—NH—C₆H₂(OCH₃)₃ | ² 165 |
| 3,4,5-(OCH₃)₃ | 7,8-(OCH₃)₂ | C₃H₇ | —N○O (morpholino) | 140 |
| 3,4,5-(OCH₃)₃ | 7,8-(OCH₃)₂ | C₃H₇ | —N (piperidino) | 102 |

See footnotes at end of table.

TABLE—Continued

| (R₃)ₘ | (R₂)₂ | R₁ | R | Melting point (degrees) |
|---|---|---|---|---|
| 3,4,5-(OCH₃)₃ | 7,8-(OCH₃)₂ | C₃H₇ | —N(C₂H₅)₂ | 110 |
| 3,4,5-(OCH₃)₃ | 7,8-(OCH₃)₂ | C₆H₅ | —N(C₂H₅)₂ | ¹ 119 |
| 3,4,5-(OCH₃)₃ | 7,8-(OCH₃)₂ | C₆H₅ | —N⟨ ⟩O | ¹ 125 |
| 3,4,5-(OCH₃)₃ | 7,8-(OCH₃)₂ | C₆H₅ | —N⟨ ⟩ | ³ 145 |
| 3,4,5-(OCH₃)₃ | 6,7-(OCH₃)₂ | CH₃ | —N⟨ ⟩O | ¹ 214 |
| 3,4,5-(OCH₃)₃ | 6,7-(OCH₃)₂ | CH₃ | —N⟨ ⟩ | ¹ 229 |
| 3,4,5-(OCH₃)₃ | 6,7-(OCH₃)₂ | C₃H₇ | —N(C₂H₅)₂ | ¹ 225 |
| 3,4,5-(OCH₃)₃ | 6,7-(OCH₃)₂ | C₃H₇ | —N⟨ ⟩O | ¹ 238 |
| 3,4,5-(OCH₃)₃ | 6,7-(OCH₃)₂ | C₆H₅ | Same as above | ¹ 120 |
| 3,4,5-(OCH₃)₃ | 6,7-(OCH₃)₂ | C₆H₅ | —N(C₂H₅)₂ | ¹ 100 |
| 3,4,5-(OCH₃)₃ | 5,7-(OCH₃)₂ | CH₃ | —N⟨ ⟩O | ¹ 180 |
| 4-OCH₃ | 7,8-(OCH₃)₂ | CH₃ | Same as above | ¹ 230 |
| 3,5-(OCH₃)₂ | 7,8-(OCH₃)₂ | CH₃ | ...do... | ¹ 238 |

¹ Hydrochloride.
² Dihydrochloride.
³ Base.

Example 3

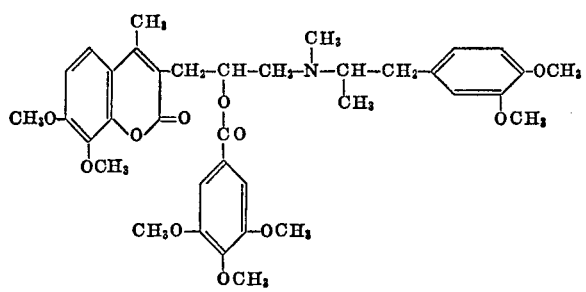

48.5 g. (0.1 mol) 3-[γ-N-methyl-N-(3,4-dimethoxyphenyl-isopropyl)-amino-β-hydroxy-propyl] - 4 - methyl-7,8-dimethoxy-coumarin are dissolved in 300 cc. anhydrous benzene and 10.1 g. (0,1 mol) triethylamine are added. Then 23 g. (0.1 mol) 3,4,5-trimethoxybenzoyl-chloride dissolved in 100 cc. anhydrous benzene are added dropwise with stirring within one hour at room temperature. The mixture is then stirred under reflux for 5 hours subsequently, while hot, filtered off with suction, from the separated triethylamine hydrochloride, and finally worked up as described in Example 1. The hydrochloride of the 3-[γ-N-methyl-N-(3,4-dimethoxyphenylisopropyl)-amino-β-(3,4,5-trimethoxybenzoyl)-propyl] - 4 - methyl-7,8-dimethoxy-coumarin is obtained in the form of colorless crystals melting at 125°.

Yield: 56 g.=78% of the theoretical.

The 3-[γ-N-methyl-N-(3,4-dimethoxyphenylisopropyl)-amino-β-hydroxy-propyl] - 4 - methyl-7,8-dimethoxy-coumarin used as starting material can be obtained as follows:

(a) 31.2 g. (0.1 mol) 3-(γ-chloro-β-hydroxy-propyl)-4-methyl-7,8-dimethoxy-coumarin and 18 g. (0.1 mol) 3,4-dimethoxyphenylisopropylamine are dissolved in 200 cc. anhydrous chlorobenzene and, after the addition of 11 g. anhydrous sodium carbonate, stirred for 12 hours at 120–130°. The reaction mixture is filtered off, while hot, from the insolute and the filtrate is evaporated to dryness at 50° in the water-jet vacuum. The crude product thus obtained is recrystallized from ethyl acetate.

The 3-[γ-N-(3,4 - dimethoxyphenylisopropyl)-amino-β-hydroxy-propyl]-4-methyl-7,8-dimethoxy-coumarin is obtained in the form of colorless crystals melting at 112°.

Yield: 42 g.=89% of the theoretical.

(b) 47.1 g. (0.1 mol) 3-[γ-N-(3,4-dimethoxyphenyl-isopropyl)-amino-β-hydroxy-propyl]-4-methyl - 7,8 - dimethoxy-coumarin are suspended in 500 cc. water and, after the addition of 13.4 g. of a 40% formaldehyde solution and 9 g. formic acid, stirred under reflux for 10–12 hours. After cooling down, the limpid solution is rendered alkaline (pH 9) with potassium carbonate and extracted with ethyl acetate. The ethyl acetate solution is again washed with water and dried over anhydrous sodium sulfate; then the solvent is evaporated to dryness at 40° in the water-jet vacuum. The residue is recrystallized from ethyl acetate and thus 3-[γ-N-methyl-N-(3,4-dimethoxyphenylisopropyl)-amino-β-hydroxy-propyl] - 4 - methyl-7,8-dimethoxy-coumarin is obtained in the form of colorless crystals which melt at 90°.

Yield: 38 g.=78% of the theoretical.

Analogously to the technique described in Example 3, para (a) and (b) the following starting materials can be obtained:

General formula:

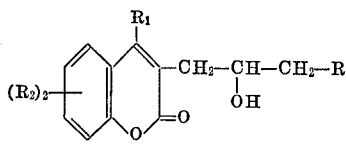

| $(R_2)_2$ | $R_1$ | R | Melting point (degrees) |
|---|---|---|---|
| 7,8-(OCH$_3$)$_2$ | CH$_3$ | —HN—CH$_2$CH=CH$_2$ | 90 |
| 7,8-(OCH$_3$)$_2$ | CH$_3$ | —HN—CH$_2$CH$_2$CH$_2$—OC$_2$H$_5$ | 115 |
| 7,8-(OCH$_3$)$_2$ | CH$_3$ | —HN—CH$_2$CH$_2$CH$_2$—N(C$_2$H$_5$)$_2$ | 105 |
| 7,8-(OCH$_3$)$_2$ | CH$_3$ | —HN—CH$_2$CH$_2$—C$_6$H$_3$(OCH$_3$)$_2$ (3,4-di-OCH$_3$) | 129 |
| 7,8-(OCH$_3$)$_2$ | CH$_3$ | —HN—CH$_2$CH$_2$—C$_6$H$_2$(OCH$_3$)$_3$ (3,4,5-tri-OCH$_3$) | 140 |
| 7,8-(OCH$_3$)$_2$ | CH$_3$ | —HN—CH(CH$_3$)—CH$_2$—C$_6$H$_2$(OCH$_3$)$_3$ | 122 |
| 7,8-(OCH$_3$)$_2$ | CH$_3$ | —HN—C$_6$H$_2$(OCH$_3$)$_3$ | [1] 219 |
| 7,8-(OCH$_3$)$_2$ | CH$_3$ | CH$_3$—N—CH$_2$—CH=CH$_2$ | [2] |
| 7,8-(OCH$_3$)$_2$ | CH$_3$ | CH$_3$—N—CH$_2$CH$_2$CH$_2$—OC$_2$H$_5$ | [1] 103 |
| 7,8-(OCH$_3$)$_2$ | CH$_3$ | CH$_3$—N—CH$_2$CH$_2$=CH$_2$—N(C$_2$H$_5$)$_2$ | [2] |
| 7,8-(OCH$_3$)$_2$ | CH$_3$ | CH$_3$—N—CH$_2$CH$_2$—C$_6$H$_3$(OCH$_3$)$_2$ | 102 |
| 7,8-(OCH$_3$)$_2$ | CH$_3$ | CH$_3$—N—CH$_2$CH$_2$—C$_6$H$_2$(OCH$_3$)$_3$ | [2] |
| 7,8-(OCH$_3$)$_2$ | CH$_3$ | CH$_3$—N—CH(CH$_3$)—CH$_2$—C$_6$H$_2$(OCH$_3$)$_3$ | [2] |
| 7,8-(OCH$_3$)$_2$ | CH$_3$ | CH$_3$—N—C$_6$H$_2$(OCH$_3$)$_3$ | [3] 70 |

[1] Hydrochloride.
[2] Oil.
[3] Hydrochloride decomposition.

From the above mentioned starting materials the following compounds under the present invention can be prepared as described in Example 3, paragraph 1:

General formula:

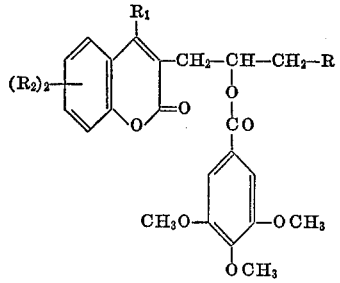

| $(R_2)_2$ | $R_1$ | R | Melting point, hydrochloride (degrees) |
|---|---|---|---|
| 7,8-(OCH$_3$)$_2$ | CH$_3$ | —N(CH$_3$)—CH$_2$CH=CH$_2$ | 70 |
| 7,8-(OCH$_3$)$_2$ | CH$_3$ | —N(CH$_3$)—CH$_2$CH$_2$CH$_2$—OC$_2$H$_5$ | 189 |
| 7,8-(OCH$_3$)$_2$ | CH$_3$ | —N(CH$_3$)—CH$_2$CH$_2$CH$_2$—N(C$_2$H$_5$)$_2$ | 75 |

TABLE—Continued

| $(R_2)_2$ | $R_1$ | R | Melting point, hydrochloride (degrees) |
|---|---|---|---|
| 7,8-$(OCH_3)_2$ | $CH_3$ | —N($CH_3$)—$CH_2CH_2$—C$_6H_3$(OCH$_3$)(OCH$_3$) | 130 |
| 7,8-$(OCH_3)_2$ | $CH_3$ | —N($CH_3$)—$CH_2CH_2$—C$_6H_2$(OCH$_3$)($CH_3O$)(OCH$_3$) | 115 |
| 7,8-$(OCH_3)_2$ | $CH_3$ | —N($CH_3$)—CH($CH_3$)—$CH_2$—C$_6H_2$(OCH$_3$)($CH_3O$)(OCH$_3$) | 120 |
| 7,8-$(OCH_3)_2$ | $CH_3$ | —N($CH_3$)—C$_6H_2$(OCH$_3$)(OCH$_3$)(OCH$_3$) | 75 |

EXAMPLE 4

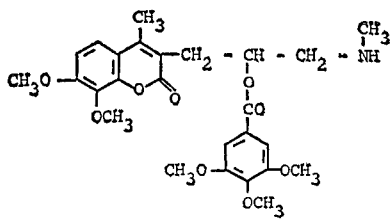

26 g. (0.0655 mol) 3-(γ-N-methyl-N-benzyl-amino-β-hydroxy-propyl)-4-methyl - 7,8 - dimethoxy-coumarin are dissolved in 200 cc. anhydrous benzene and 10.1 g. (0.1 mol) triethylamine are added. A solution of 23 g. (0.1 mol) 3,4,5-trimethoxybenzoylchloride in 80 cc. anhydrous benzene is then added dropwise with stirring at room temperature. Stirring is continued for 2 hours, then the reaction mixture is heated to the boil and stirred under reflux for another 5 hours. After cooling down the precipitated triethylamine hydrochloride is filtered off with suction and the filtrate is evaporated to dryness under reduced pressure. The residue thus obtained is dissolved in ethyl acetate. For further purification the ethyl acetate solution is washed with water, a 10% aqueous sodium bicarbonate solution and again with water. After having been dried over anhydrous sodium sulfate the ethyl acetate solution is evaporated to dryness in a vacuum and the resulting oily residue is admixed with anhydrous ether. Thus, 3-[γ-N-methyl-N-benzyl-amino - β - (3,4,5 - trimethoxybenzoxy) - propyl] - 4 - methyl-7,8-dimethoxy-coumarin is obtained in the form of colorless needles melting at 118–120°.

Yield: 25 g.=64.6% of theoretical.

25 g. (0.0423 mol) 3-[γ-N-methyl-N-benzyl-amino-β-(3,4,5 - trimethoxybenzoxy) - propyl] - 4 - methyl-7,8-dimethoxy-coumarin are dissolved in 150 cc. ethanol and, after the addition of the equivalent amount of alcoholic hydrochloric acid, hydrogenized at 40° with 3 g. of a 5% palladium coal and with a hydrogen pressure of 2 atmospheres. After approx. 2 hours the hydrogenation is finished. The catalyst is filtered off, while hot, and the filtrate is evaporated to dryness in a vacuum. The residue is stirred with anhydrous ether. After the mixture has been allowed to stand for a while, the hydrochloride of 3-[γ-methylamino - β - (3,4,5 - trimethoxybenzoxy)-propyl]-4-methyl-7,8-dimethoxy crystallizes out in the form of colorless needles melting at 166–169°.

Yield: 19 g.=83.7% of the theoretical.

The 3-(γ - N - methyl-benzyl-amino-β-hydroxy-propyl)-4-methyl-7,8-dimethoxy-coumarin required as starting material can be prepared as follows:

(a) 31.2 g. (0.1 mol) 3-(γ-chloro-β-hydroxy-propyl)-4-methyl-7,8-dimethoxy-coumarin and 21.4 g. (0.2 mol) benzylamine are dissolved in 150 cc. anhydrous chlorobenzene and, after the addition of 11 g. anhydrous sodium carbonate, stirred for 15 hours at 120°. After cooling down, the precipitated sodium chloride is filtered off with suction and the filtrate is evaporated to dryness under reduced pressure. The residue thus obtained is dissolved in ethyl acetate, washed with water and the ethyl acetate solution, after having been dried over potassium carbonate, is evaporated to dryness under reduced pressure. The reaction product crystallizes out in the from of colorless needles melting at 112–114°.

Yield: 28 g.=73% of the theoretical.

(b) 28 g. (0.073 mol) 3-(γ-benzylamino-β-hydroxy-propyl)-4-methyl-7,8-dimethoxy-coumarin are dissolved in a mixture of 22 g. of a 90% formic acid, 25 cc. water and 16.5 cc. of a 40% aqueous formaldehyde solution and heated for 10 hours with stirring under reflux. After cooling down, the reaction mixture is rendered alkaline by introducing solid potassium carbonate, and the precipitating oil is dissolved in ethyl acetate. The ethyl acetate solution is washed several times with water and, after having been dried over anhydrous potassium carbonate, evaporated to dryness under reduced pressure. Thus, 3-(γ - N - methyl - N - benzyl-amino-β-hydroxy-propyl)-4-methyl-7,8-dimethoxy-coumarin is obtained in the form of a colorless oil which may be used without additional purification for further reactions.

Yield: 26 g.=90% of the theoretical.

EXAMPLE 5

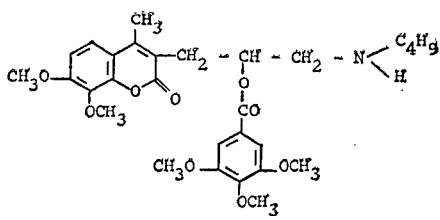

28 g. (0.058 mol) 3-(γ - N - benzyloxycarbonyl-N-n-butylamino - β - hydroxy-propyl) - 4 - methyl - 7,8 - dimethoxy-coumarin are suspended in 200 cc. anhydrous toluene and 9 g. (0.09 mol) triethylamine are added. A solution of 20.8 g. (0.09 mol) 3,4,5-trimethoxybenzoyl-chloride in 80 cc. anhydrous toluene is then added dropwise, with stirring, at room temperature. The reaction mixture is stirred at 100° for 12 hours and, after cooling down, washed with a 10% aqueous sodium bicarbonate solution and with water. The toluene layer is separated, dried over anhydrous potassium carbonate and evaporated to dryness under reduced pressure. The oily residue is stirred, with heating, in anhydrous ether and filtered off from small quantities of solids. After having been allowed to stand for a while, 3-[γ - N - benzyloxycarbonyl-N-n-butyl-amino - β - (3,4,5-trimethoxy-benzoxy)-propyl]-4-methyl-7,8-dimethoxy-coumarin crystallizes out in the form of colorless needles melting at 98–102°.

Yield: 28 g.=71.2% of the theoretical.

28 g. (0.0414 mol) 3-[γ - N - benzyloxycarbonyl-N-n-butylamino - β - (3,4,5 - trimethoxybenzoxy)-propyl]-4-methyl-7,8-dimethoxy-coumarin are introduced, with stirring, at room temperature into 80 g. glacial acetic acid saturated with gaseous hydrobromic acid. When the introduced substance has dissolved with the generation of carbon dioxide, the reaction mixture is stirred for 1 hour at room temperature. The limpid reaction solution is then diluted with 5 times the quantity of anhydrous ether. After having been allowed to stand for a while, the hydrobromide of 3-[γ-n-butylamino - β - (3,4,5-trimethoxybenzoxy)-propyl]-4-methyl - 7,8 - dimethoxy-coumarin is obtained in the form of a crystalline powder having a decomposition point of 90°.

Yield: 23 g.=89% of the theoretical.

The 3-(γ-N-benzyloxy-carbonyl-N-n-butyl-amino-β-hydroxy-propyl) - 4 - methyl - 7,8 - dimethoxy-coumarin used as starting material can be prepared as follows:

(a) 31.2 g. (0.1 mol) 3-(γ-chloro-β-hydroxy-propyl)-4-methyl - 7,8 - dimethoxy-coumarin are dissolved with heating in 250 cc. ethanol and, after the addition of 40 g. (0.55 mol) n-butylamine, stirred under reflux for 15 hours. After cooling down, the reaction product, precipitating in the form of crystals, is filtered off with suction, and the filtrate is concentrated under reduced pressure. After the mother liquor thus obtained has been allowed to stand for a while small quantities of the product may additionally be isolated, which are then recrystallized from ethyl acetate for further purification purposes. Thus, 3-(γ-n-butylamino-β-hydroxy-propyl) - 4 - methyl-7,8-dimethoxy-coumarin is obtained having a melting point of 130°.

Yield: 24 g.=69% of the theoretical.

(b) 8 g. (0.081 mol) phosgene are passed, with stirring, and cooling by means of an ice bath into 50 cc. anhydrous toluene. With cooling, a solution of 8 g. (0.074 mol) benzylalcohol in 20 cc. anhydrous toluene is added dropwise. This reaction solution is stirred for ½ hour in an ice bath and then for another 2 hours at room temperature. After having been evaporated to dryness under reduced pressure, the residue is diluted with 20 cc. methylene chloride and added dropwise, with stirring at a temperature of 5–10°, to a solution of 24 g. (0.069 mol) 3 - (γ - n - butylamino - β - hydroxy-propyl) - 4 - methyl-7,8-dimethoxy-coumarin and 7.2 g. (0.071 mol) triethylamine in 180 cc. methylene chloride. After having been stirred for 12 hours at room temperature, the reaction solution is washed several times with water, dried with anhydrous sodium sulfate and evaporated to dryness under reduced pressure. The residue is stirred with little anhydrous ether, filtered off with suction and dried. Thus, 3 - (γ - N - benzyloxycarbonyl - N - n - butyl-amino-β-hydroxy-propyl) - 4 - methyl - 7,8 - dimethoxy-coumarin is obtained, melting at 109–110°.

Yield: 28 g.=84% of the theoretical.

EXAMPLE 6

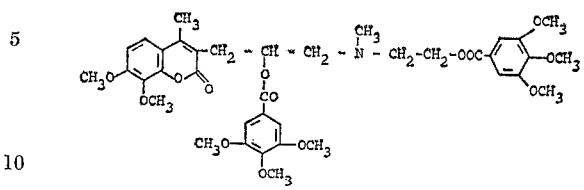

38.75 g. (0.1 mol) of the hydrochloride of 3-(γ-N-methyl - N - β - hydroxyethyl-amino-β-hydroxy-propyl)-4-methyl-7,8-dimethoxy-coumarin are dissolved in 200 cc. anhydrous chloroform and 30.3 g. (0.3 mol) triethylamine are added. Within one hour a solution of 46 g. (0.2 mol) 3,4,5-trimethoxybenzoylchloride in 150 cc. anhydrous chloroform is added dropwise with stirring at room temperature into the limpid reaction mixture. After the decay of the exothermic reaction stirring is continued for 2 hours at 40–50°. The reaction solution obtained is washed at first several times with water, then with a 10% aqueous sodium bicarbonate solution and again with water. The solvent is then distilled off at 40° in a water-jet vacuum, and, for further purification, the residue, a light-yellow oil is dissolved in diluted aqueous hydrochloric acid. This solution is extracted with ether and rendered limpid by filtration. By adding potassium carbonate until the mixture shows an alkaline reaction (pH 9), the desired diester separates out in the form of a colorless oil. The reactant is extracted with ethyl acetate, the ethyl acetate solution is washed several times with water and dried over anhydrous sodium sulfate. The solvent is then distilled off at 40° in a water-jet vacuum and the residue, a colorless oil, is dissolved in anhydrous ether. By adding etheric hydrochloric acid until congo paper turns blue, the hydrochloride of 3 - [γ-N-methyl-N-β-(3,4,5-trimethoxybenzoxy)-ethyl - amino - β - (3,4,5 - trimethoxybenzoxy)propyl]-4-methyl-7,8-dimethoxy-coumarin is obtained in the form of colorless crystals melting at 118° with decomposition. Yield: 63 g.=81% of the theoretical.

The hydrochloride of 3-(γ-N-methyl-N-β-hydroxyethyl-amino - β - hydroxy-propyl) - 4 - methyl - 7,8 - dimethoxy-coumarin having a melting point of 98–102°, which, in Example 6, is used as starting material, is obtained by the reaction of 3-(γ-chloro-β-hydroxy-propyl)-4-methyl-7,8-dimethoxy-coumarin with N-methyl-ethanolamine, according to the technique described in Example 1, paragraph 2.

The following starting materials can be prepared analogously:

General formula:

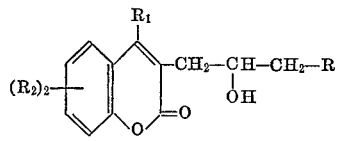

| (R₂)₂ | R₁ | R | Melting point (degrees) |
|---|---|---|---|
| 7,8-(OCH₃)₂ | CH₃ | —N(CH₃)—CH₂CH₂CH₂OH | ¹ 65 |
| 7,8-(OCH₃)₂ | CH₃ | —N(C₄H₉)—CH₂CH₂OH | (²) |
| 7,8-(OCH₃)₂ | CH₃ | —N[CH(CH₃)₂]—CH₂CH₂OH | ³ 161 |
| 7,8-(OCH₃)₂ | CH₃ | —N(CH₂—C₆H₅)—CH₂CH₂OH | (²) |
| 7,8-(OCH₃)₂ | C₃H₇ | —N(CH₃)—CH₂CH₂OH | ³ 131 |
| 7,8-(OCH₃)₂ | C₆H₅ | —N(CH₃)—CH₂CH₂OH | 86 |
| 6,7-(OCH₃)₂ | CH₃ | —N(CH₃)—CH₂CH₂OH | ¹ 120 |
| 6,7-(OCH₃)₂ | C₆H₅ | —N(CH₃)—CH₂CH₂OH | ³ 156 |
| 5,7-(OCH₃)₂ | CH₃ | —N(CH₃)—CH₂CH₂OH | ¹ 87 |

¹ Base.
² Oily.
³ Hydrochloride.

Analogously to the description given in Example 6 the following derivatives of the below-mentioned general formula can be prepared:

General formula:

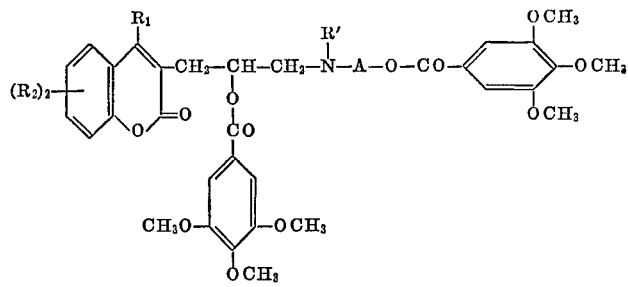

| (R₂)₂ | R₁ | R' | A | Melting point or decomposition point, hydrochloride (degrees) |
|---|---|---|---|---|
| 7,8-(OCH₃)₂ | CH₃ | CH₃ | —CH₂—CH₂—CH₂— | 125 |
| 7,8-(OCH₃)₂ | CH₃ | C₄H₉ | —CH₂—CH₂— | 77 |
| 7,8-(OCH₃)₂ | CH₃ | CH(CH₃)₂ | —CH₂—CH₂— | 165 |
| 7,8-(OCH₃)₂ | CH₃ | CH₂—C₆H₅ | —CH₂—CH₂— | 105 |
| 7,8-(OCH₃)₂ | C₃H₇ | CH₃ | —CH₂—CH₂— | 118 |
| 7,8-(OCH₃)₂ | C₆H₅ | CH₃ | —CH₂—CH₂— | 135 |
| 6,7-(OCH₃)₂ | CH₃ | CH₃ | —CH₂—CH₂— | 125 |
| 6,7-(OCH₃)₂ | C₆H₅ | CH₃ | —CH₂—CH₂— | 130 |
| 5,7-(OCH₃)₂ | CH₃ | CH₃ | —CH₂—CH₂— | 114 |

EXAMPLE 7

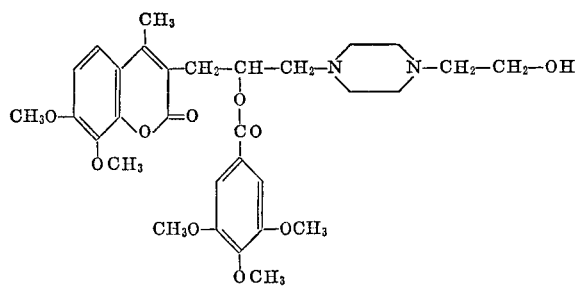

47.8 g. (0.1 mol) 3-{γ-4-[β-(ethoxycarbonyloxy)-ethyl]-piperazino[1]-β-hydroxy-propyl}-4 - methyl - 7,8-dimethoxy-coumarin are dissolved in 200 cc. anhydrous chloroform and 10.1 g. (0.1 mol) triethylamine are added. Within one hour, a solution of 23 g. (0.1 mol) 3,4,5-trimethoxybenzoylchloride in 100 cc. anhydrous chloroform is added dropwise with stirring at room temperature. After the decay of the exothermic reaction, the reaction mixture is stirred for 2 hours at 40–50° and worked up as described in Example 1. The 3-{γ-4-[β-(ethoxycarbonyloxy)-ethyl]-piperazino[1]-β - (3,4,5 - trimethoxybenzoxy)-propyl} - 4 - methyl - 7,8 - dimethoxy-coumarin is obtained in the form of colorless crystals having a melting point of 88–90°.

Yield: 55 g.=82% of the theoretical.

67.2 g. (0.1 mol) 3-{γ-4-[β-(ethoxycarbonyloxy)-ethyl]-piperazino[1]-β - (3,4,5 - trimethoxybenzoxy)-propyl}-4-methyl-7,8-dimethoxy-coumarin are stirred for 4 hours at 70–80° in 100 cc. 10% aqueous hydrochloric acid. After cooling down, the limpid solution is rendered alkaline with potassium carbonate, and the precipitated colorless oil is extracted with ethyl acetate. The organic solution is dried over anhydrous sodium sulfate and evaporated to dryness at 40° in the water-jet vacuum. The residue, a colorless oil, is dissolved in anhydrous ether. By adding etheric hydrochloric acid, until congo paper turns blue, the dihydrochloride of 3-[γ-4-(β-hydroxyethyl) - piperazino[1] - β - (3,4,5 - trimethoxybenzoxy)-propyl] - 4-methyl-7,8-dimethoxy-coumarin is obtained in the form of colorless crystals melting at 155° with decomposition.

Yield: 45 g.=67% of the theoretical.

The 3-{γ-4-[β-(ethoxycarbonyloxy)-ethyl]-piperazino-[1]-β-hydroxy-propyl} - 4 - methyl - 7,8 - dimethoxy-coumarin which is used as starting material can be prepared as follows:

40.6 g. (0.1 mol) 3 - [γ-4-(β-hydroxyethyl)-piperazino-[1] - β - hydroxy-propyl] - 4 - methyl-7,8-dimethoxy-coumarin (prepared according to the technique described in British Pat. 1,135,907, Example 2, paragraphs 2 and 3) are dissolved in 200 cc. anhydrous chloroform and 10.1 g. (0.1 mol) triethylamine are added. A solution of 10.8 g. (0.1 mol) ethyl chloroformate in 100 cc. anhydrous chloroform is added dropwise within 1 hour at room temperature. The reaction solution is stirred for 5 hours at room temperature, washed several times with water, with a 10% aqueous sodium bicarbonate solution and again with water. After having been dried over anhydrous sodium sulfate, the solvent is distilled off at 40° in a water-jet vacuum. The residue is recrystallized from isopropanol. Thus, 3-{γ-4-[β-(ethoxycarbonyloxy)-ethyl]-piperazino[1]-β-hydroxy-propyl} - 4 - methyl-7,8-dimethoxy-coumarin is obtained in the form of colorless crystals, having a melting point of 118°.

Yield: 40 g.=83.5% of the theoretical.

The 3-{γ-4-[β-hydroxyethyl]-piperazino[1] - β - (3,4,5-trimethoxybenzoxy)-propyl} - 4 - methyl - 7,8-dimethoxy-coumarin can also be prepared by reacting at 120° and with the concurrent use of triethylamine 3-[γ-chloro-β-(3,4,5 - trimethoxybenzoxy)-propyl] - 4-methyl-7,8-dimethoxy-coumarin with N-β-hydroxyethyl-piperazine in chlorobenzene according to the technique described in Example 8.

If 3-[γ-(N-butyl-N-β-ethoxycarbonyloxy-ethylamino)-β- (3,4,5 - trimethoxybenzoxy)-propyl] - 4-methyl-7,8-dimethoxy-coumarin is used as starting material according to the description given in paragraph 2 of the present example, instead of 3-{γ - 4 - [β-(ethoxycarbonyloxy)-ethyl]-piperazino[1] - β - (3,4,5 - trimethoxybenzoxy)-propyl} - 4 - methyl - 7,8-dimethoxy-coumarin, after saponification, 3 - [γ-(N-butyl-N-β-hydroxyethyl-amino)-β - (3,4,5 - trimethoxybenzoxy)-propyl]-4-methyl-7,8-dimethoxy-coumarin is obtained, the hydrochloride of which has a melting point of 162°.

EXAMPLE 8

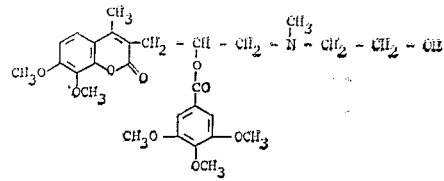

50.6 g. (0.1 mol) 3 - [γ-chloro-β-(3,4,5-trimethoxybenzoxy)-propyl] - 4 - methyl - 7,8 - dimethoxy-coumarin and 10.6 g. (0.1 mol) sodium carbonate are suspended in 120 cc. anhydrous chlorobenzene and, after the addition of 8 g. (0.107 mol) N-methylethanolamine, stirred for 12 hours at 120–125°. After cooling down, the precipitated sodium chloride is filtered off with suction and the filtrate is evaporated to dryness under reduced pressure. The residue thus obtained is dissolved in approx. 300 cc. ethyl acetate and shaken out with diluted hydrochloric acid. The aqueous hydrochloric acid phase is separated and rendered alkaline by introducing solid potassium carbonate. The precipitating oily reaction product is dissolved in ether. The etheric solution is dried over potassium carbonate and by introducing gaseous hydrochloric acid, the hydrochloride of 3-[γ-N-methyl-N-β-hydroxyethyl-amino-β-(3,4,5 - trimethoxybenzoxy)-propyl]-4-methyl-7,8-dimethoxy-coumarin is obtained in the form of colorless crystals, which has a decomposition point of 70°.

Yield: 24 g.=41.3% of the theoretical.

The 3 - [γ - chloro - β - (3,4,5 - trimethoxybenzoxy)-propyl]-4-methyl-7,8-dimethoxy-coumarin which is used as starting material can be obtained as follows:

31.2 g. (0.1 mol) 3 - (γ-chloro-β-hydroxy-propyl)-4-methyl - 7,8 - dimethoxy-coumarin (prepared according to the technique described in British Pat. 1,135,907, Example 2, paragraph 2) and 25 g. (0.108 mol) 3,4,5-trimethoxybenzoylchloride are admixed and heated with stirring at approx. 100°. The reaction mixture is stirred for approx. 5 hours at 100° and allowed to cool down. The solid reaction mixture is then dissolved in ethyl acetate and washed several times with diluted sodium carbonate solution. The ethyl acetate solution is then dried over anhydrous sodium sulfate and evaporated to dryness under reduced pressure. Thus, 3-[γ-chloro-β-(3,45 - trimethoxybenzoxy)-propyl] - 4 - methyl-7,8-dimethoxy-coumarin is obtained in the form of colorless needles having a melting point of 165–167°.

Yield: 41 g.=81% of the theoretical.

Analogously, by reacting 3 - (γ-chloro-β-hydroxy-propyl) - 4 - methyl - 6,7 - dimethoxy-coumarin with 3,4,5-trimethoxybenzoyl-chloride, the corresponding 6,7-dimethoxy-coumarin derivative melting at 170° is obtained, which is converted into the hydrochloride of 3-[γ - N - methyl - N - β - hydroxyethyl-amino-β-(3,4,5-trimethoxybenzoxy)-propyl] - 4 - methyl - 6,7-dimethoxy-coumarin havig a decomposition point of 116°, when condensed with N-methyl-ethanolamine as described in Example 8, paragraph 1.

What we claim is:
1. A coumarin compound having the formula

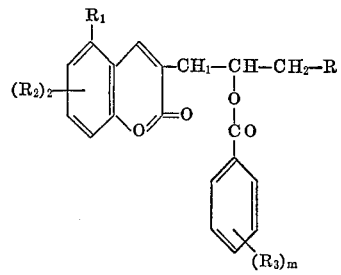

or the hydrochloric acid addition salt thereof, wherein
R is selected from the group consisting of morpholino, piperadino and pyrrolidino,
$R_1$ is selected from the group consisting of low-molecular alkyl radicals having 1–4 carbon atoms and phenyl,
$R_2$ stands for 5,7-, 6,7-, and 7,8-positioned alkoxy groups having 1–4 carbon atoms,
$R_3$ is selected from alkoxy radicals having 1–4 carbon atoms, and
m is selected from the integers 1, 2 and 3.

2. A coumarin derivative as set forth in claim 1, wherein
R is selected from the group consisting of morpholino, piperidino, and pyrrolidino,
$R_1$ is selected from the group consisting of methyl, propyl and phenyl,
$R_2$ stands for 5,7-, 6,7- and 7,8-positioned methoxy and butoxy,
$R_3$ is selected from 3,4,5-trimethoxy and -butoxy.

3. 3 - [γ - morpholino-β-(3,4,5-trimethoxybenzoxy)-propyl]-4-methyl-7,8-dimethoxy-coumarin, or the hydrochloric acid addition salt thereof.

No references cited.

ALEX MAZEL, Primary Examiner

J. TOVAR, Assistant Examiner

U.S. Cl. X.R.

260—294.3 C; 326.3, 343.2 R; 424—248

UNITED STATES PATENT OFFICE
CERTIFICATE OF CORRECTION

Patent No. 3,652,557              Dated  March 28, 1972

Inventor(s) Rudi Beyerle, et. al.

It is certified that error appears in the above-identified patent and that said Letters Patent are hereby corrected as shown below:

Column 26, the formula of claim 1 should read as follows:

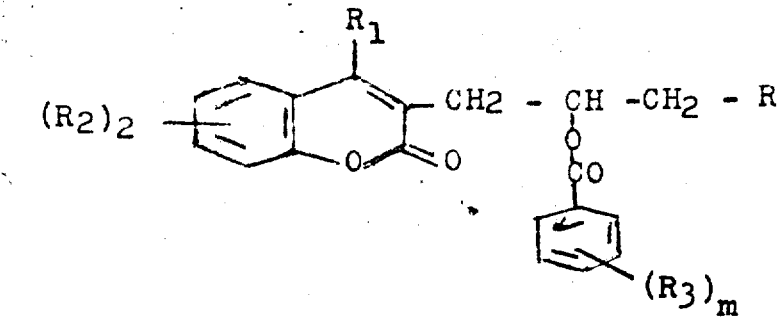

Signed and sealed this 12th day of December 1972.

(SEAL)
Attest:

EDWARD M. FLETCHER, JR.          ROBERT GOTTSCHALK
Attesting Officer                Commissioner of Patents